3,239,485
POLYAMIDE CONTAINING MoS₂ AND HEXA-
METHYLENETETRAMINE AS STABILIZERS
Gawain B. Koch, Oley, Pa., assignor to Polymer Processes
Inc., a corporation of Pennsylvania
No Drawing. Filed Feb. 19, 1962, Ser. No. 174,289
1 Claim. (Cl. 260—45.75)

This invention relates to novel stabilized molding compositions of synthetic long-chain high-melting point polyamides, such polyamides commonly being referred to as "nylons." The invention is also concerned with stock shapes and with machine and industrial parts or the like made of stabilized nylon compositions, and with a method of making such articles or parts, especially parts which are subject to heating in use, for instance, as a result of environmental conditions, as a result of friction, etc. Typical examples are bearings, gears, rollers, cams, tubing, strip, etc.

It is well known that the incorporation of finely divided molybdenum disulphide in nylon dispersed throughout the material will greatly improve the physical properties of the resins and thus widen their utility for manufacture of machine and industrial parts. The incorporation of molybdenum disulphide in nylon to improve the physical properties thereof is more fully described and claimed in U. S. Patent 2,855,377 to Stott. Extensive experience with molybdenum disulphide has indicated certain minor shortcomings of the material when used in nylon compositions. It has been found that under certain conditions of high temperature and/or high humidity, oxidization of the molybdenum disulphide and subsequent hydrolysis may take place by reaction of water therewith with the evolution of slight amounts of acid or formation of hydrogen sulphide; and, further oxidation of the hydrogen sulphide may take place with the formation of sulphurous or sulphuric acid. Additionally, there may be some residual hydrofluoric acid present in the molybdenum disulphide which is quite commonly used in the purification of the molybdenum disulphide. These acidic products and contaminants degrade the nylon and deleteriously affect the physical properties thereof. During the molding of the nylon compositions containing the molybdenum disulphide and acidic reaction products or contaminants great difficulties can arise. For example, during the injection molding and extrusion of molybdenum disulphide filled nylon compositions, a drooling of the material may occur. Drooling is a condition whereby the material drools or oozes out of the nozzle, that is, there is no sharp cut-off at the end of each molding cycle. Drooling is believed to be caused by, inter alia, a change in viscosity of the nylon due to degradation thereof by acidic contaminants. The drooling condition is often attended by foaming and bubbling of the material and large lumps may appear in the molded product. Thus, faulty parts results and considerable material is wasted. It has also been found, that when articles made from such composition having deleterious acidic constituents in them are placed in service and come in contact with metal surfaces, a pitting and scoring of the metal surface may occur.

It is an object of the present invention to obviate the hereinabove mentioned difficulties by providing a stabilized nylon molding composition. This object is accomplished by incorporating in the nylon molding composition a completely compatible amine compound more fully described below.

In its broader aspects the invention contemplates the use of a compatible amine neutralizer and stabilizer to counteract the deleterious effects of any acidic contaminant which may be present in the nylon but especially to counteract and eliminate the deleterious effects of acidic reaction products and contaminants which are present in nylon compositions as a result of the addition of the very useful filler material, molybdenum disulphide. It is another object of the invention to use the amine stabilizer so as to permit the incorporation of greater amounts of molybdenum disulphide in nylon compositions than have heretofore been possible.

Other objects of the invention are to provide stabilized nylon articles and their methods of manufacture. Additional objects and advantages of the invention will become apparent from the following description and the appended claim.

The prior art has recognized that molybdenum disulphide tends to break down under adverse conditions with the formation of acids and has suggested the use of inorganic stabilizers such as alkaline earth metal oxides, hydroxides, carbonates and ethoxides. Such prior art alkaline stabilizers have been tried with various nylon compositions and found them to be incompatible therewith as evidenced by the formation of bubbles, lumps and porosity on injection molded articles, compression molded articles, and extruded strips. It has been found, however, that the addition of a stabilizing amount of hexamethylenetetramine to nylon compositions containing the molybdenum disulphide filler stabilizes the nylon composition and thereby permits easy processing of the nylon composition in conventional molding equipment such as injection molding devices, compression molding devices, and extruders, eliminates drooling and bubbles, porosity, cracks and lumps in the nylon product, prevents scoring and pitting of metal surfaces which come in contact with the finished nylon article, and maintains the physical properties of the nylon by preventing degradation thereof. As used in this specification, a stabilizing amount of the amine additive is understood to mean that amount which is sufficient to eliminate one or more of the detrimental effects noted above which otherwise would be present or have to be contended with due to the deleterious action of the acidic reaction products and/or acidic contaminants. This stabilizing amount will ordinarily vary by weight from about ⅒ of 1% to about 5%, with a preferred amount ranging from about 2–3%, based on the weight of the molybdenum disulphide additive, since amounts less than ⅒ of 1% have been found somewhat ineffective and amounts greater than 5% do not produce any material improvements over lower percentages.

Hexamethylenetetramine is a dry powdered material, having the empirical formula $C_6H_{12}N_4$, a molecular weight of 148.19 and the following graphic formula:

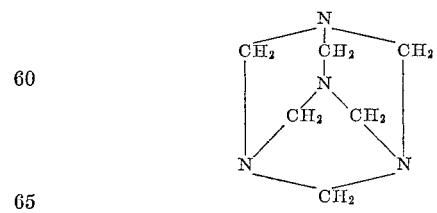

The hexamethylenetetramine which is easily handled and relatively non-toxic may be admixed with molybdenum disulphide and the mixture thereafter incorporated in the nylon in powder or fine particle form, as by tumbling flake or granular nylon with a disulphide powder. The molybdenum disulphide containing the amine stabilizer may alternatively be incorporated by mechanically mixing the flake or granular nylon with a dispersion of disulphide after which the mixed materials may be dried. It is also possible to admix the finely divided molybdenum disulphide directly with the nylon powder and thereafter add the amine stabilizer to the nylon and molybdenum disulphide admixture. In either event, after incorporation of the molybdenum disulphide and amine stabilizer, the nylon material may thereafter be melted or softened and pieces or articles formed therefrom either by pressure molding, by extrusion, by injection molding, by casting or by any other desired forming technique. In this manner, stock shapes such as rod, strip, plate, discs, tubing, bushing stock, tubular bar, etc., may be produced from which useful machine or industrial parts may be produced. Or, the machine parts or industrial parts may be molded directly, i.e., without going through the steps of producing intermediate stock shapes.

The nylon material may be modified somewhat by the presence of small quantities of other constituents, so long as the material consists essentially of nylon, and provided the modifiers are not of such character or present in such amounts as to destroy the improved characteristics imparted by the molybdenum disulphide. For example, other fillers, for instance, graphite, may be added, and other modifiers, pigments, dyes or the like added for other purposes. Various of these additional materials have been employed for a variety of purposes and when used are present in quantities ranging up to about 5%.

The following examples will further illustrate the invention, it being understood that the invention is not intended to be limited thereby:

EXAMPLE I

Finely divided molybdenum disulphide was incorporated in a nylon (polyhexamethylene adipamide) powder by tumbling the ingredients together. Molybdenum disulphide was present in an amount of about 2.50% based on the weight of the nylon. This lot was labeled Lot A. Another lot, containing a similar proportion of molybdenum disulphide and labeled Lot B, was prepared except that hexamethylenetetramine was dry-blended with the molybdenum disulphide in an amount of 2% by weight based upon the weight of the molybdenum disulphide prior to the addition of the molybdenum disulphide to the nylon. Both lots were extruded into ⅛″ strip in conventional extrusion machinery. Lot A extruded poorly and the resulting strip had bubbles in it. Lot B extruded smoothly and no bubbles, or lumps, were observed in the resulting product (extruded strip). This example demonstrates vividly that hexamethylenetetramine is perfectly compatible with the nylon and acts to counteract any acidity in the product due to hydrolysis and/or oxidation of the molybdenum disulphide or from any other source which otherwise would deleteriously affect the product as evidenced by the formation of bubbles, lumps, porosity, etc.

EXAMPLE II

Polyhexamethylene adipamide powder was intimately mixed with finely divided molybdenum disulphide. Various stabilizers were added by the incorporation thereof in the molybdenum disulphide prior to the addition of the molybdenum disulphide to the polyhexamethylene adipamide. The resulting mixtures were extruded into ⅛″ strip stock and the results noted as shown in the table below.

Table A

| Polyamide Resin | Weight Percent of Molybdenum Disulphide Added (Based on Weight of Nylon) | Weight Percent Stabilizer Added (Based on Weight of Molybdenum Disulphide) | Extrusion and Product Characteristics |
|---|---|---|---|
| Polyhexamethylene Adipamide. | 2½ | 2% of Ba(OH)₂ | Small bubbles observed in product. Good extrusion. |
| Do | 2½ | 2% of Ca(OH)₂ | Some porosity noticeable. Good Extrusion. |
| Do | 2½ | 2% of hexamethylenetetramine. | Very good extrusion. No bubbles, lumps, porosity, or cracks noted in product. |

As noted from the data above, typical prior art alkaline stabilizers such as barium hydroxide and calcium hydroxide were inadequate and resulted in a bubbly or porous product. The hexamethylenetetramine stabilizer gave a product which extruded easily and which was free from bubbles, lumps and cracks.

In the examples given above, polyhexamethylene adipamide was used. However, similar results were obtained when the nylons involved were polyhexamethylene sebacamide, co-polymers of the adipamide and the sebacamide; polymerized epsilon caprolactam (ε-amino caproic acid), co-polymers of the adipamide and caprolactam; co-polymers of the adipamide, sebacamide and caprolactam; polymerized 11-amino undecanoic acid; and, mixtures or physical blends of two or more of the above-mentioned polymers and/or co-polymers. That is, the absence of any stabilizer with the various nylons noted above gave a composition which was difficult to extrude and was inferior as evidenced by the formation of bubbles and/or lumps in the product. Prior art stabilizers such as barium hydroxide and calcium hydroxide were ineffective whereas the use of hexamethylenetetramine produced products free of bubbles, lumps and cracks.

The amount of molybdenum disulphide that may be employed in the practice of the present invention, although varying somewhat depending upon the purposes to which the ultimate article will be put, should be, by weight, from about 0.25% to about 15% based on the weight of the nylon constituent. It is noted that the prior art cautions against the use of additions above about 5%, since percentages greater than 5% were ordinarily very difficult to disperse in the nylon. With the advent of ultra-fine molybdenum disulphide having a particle size range of from approximately 0.7 micron to about 25 microns with 5% of the particles by weight being larger than 10 microns and 95% of the particles being less than 10 microns, it has been found that the weight percentage of molybdenum disulphide may be increased to about 15% based on the weight of the nylon, since the ultra-fine particle size molybdenum disulphide is easier to disperse and has less tendency to cause brittleness when uniformly dispersed. However, because of the greater surface area of the ultra-fine molybdenum disulphide as compared with the larger prior art molybdenum disulphide filler (particle size range of from about 1–80 microns with approximately 85% by weight of the particles being larger than 10 microns and 15% by weight being less than 10 microns) the tendency to oxidize and form harmful acidic reaction products is also greater whereby the benefits to be gained by incorporating larger amounts of molybdenum disulphide in the nylon would be offset by the detrimental effects of the acidic products upon the nylon, except for the fact that the presence of the hexamethylenetetramine stabilizer and neutralizer permits the incorporation of the molybdenum disulphide in amounts up to about 15% by weight.

Machine parts and industrial parts as well as stock shapes made of the improved stabilized molybdenum disulphide filled nylon composition retain their excellent physical properties of superior heat resistance, improved dimensional stability, higher strength, greater wear resistance and lower surface friction while at the same time the shaping operations (be it extrusion molding, compression molding, injection molding or other molding process) may be better carried out without the formation of bubbles, lumps in the product, or drooling of the material from the injection nozzle, and without degradation of the basic nylon resin by acidic contaminants to which nylon is particularly sensitive at the molding temperature normally employed in molding and shaping nylon.

While there have been shown and described particular embodiments of the invention, it will be obvious to those skilled in the art that changes and modifications may be made without departing from the invention, and, therefore, it is intended by the appended claim to cover all such changes and modifications as fall within the true spirit and scope of the invention.

What is claimed is:

A molding composition comprising an intimate mixture of a synthetic, long chain, high melting nylon polyamide; from about 0.25% to 15% by weight based on the weight of the polyamide of molybdenum disulfide in fine particle form; and from about 0.1% to 5% by weight based on the weight of the molybdenum disulfide of hexamethylenetetramine.

References Cited by the Examiner

UNITED STATES PATENTS

| | | | |
|---|---|---|---|
| 2,071,250 | 2/1937 | Carothers | 260—78 |
| 2,322,938 | 6/1943 | Howard | 260—45.9 |
| 2,849,415 | 8/1958 | Stott | 260—37 |

LEON J. BERCOVITZ, *Primary Examiner.*

ALPHONSO D. SULLIVAN, *Examiner.*